A. E. SCHAD.
DUPLEX FORCE FEED LUBRICATOR.
APPLICATION FILED FEB. 10, 1908. RENEWED MAR. 14, 1911.
991,547.
Patented May 9, 1911.
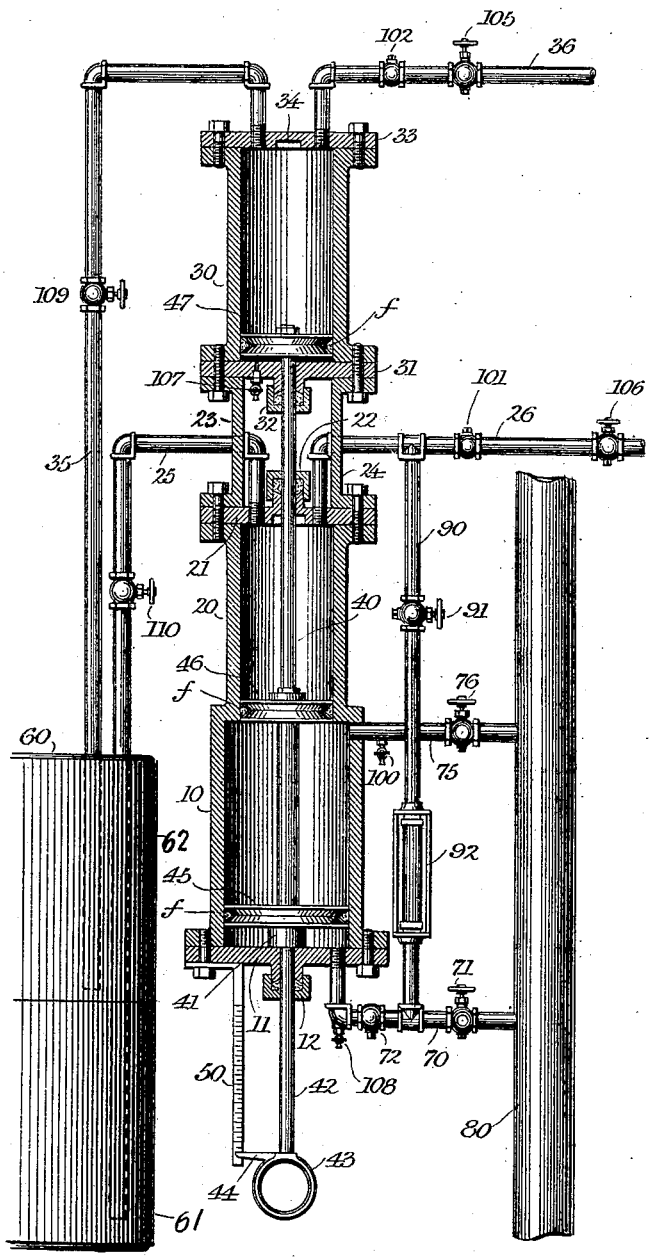

UNITED STATES PATENT OFFICE.

ALBERT E. SCHAD, OF BELLEFONTE, PENNSYLVANIA.

DUPLEX FORCE-FEED LUBRICATOR.

991,547.      Specification of Letters Patent.      Patented May 9, 1911.

Application filed February 10, 1908, Serial No. 415,149. Renewed March 14, 1911. Serial No. 614,455.

*To all whom it may concern:*

Be it known that I, ALBERT E. SCHAD, a citizen of the United States of America, residing at Bellefonte, in the county of Center, in the State of Pennsylvania, have invented certain new and useful Improvements in Duplex Force-Feed Lubricators, whereof the following is a specification.

This invention relates to an automatic force feed lubricator designed to distribute from a central point—as for instance the engine room of a power plant—lubricating oils to any number of engines, motors and machines disposed throughout the plant or factory.

An object of the invention is to provide a duplex lubricator which will feed to the machinery of the factory or plant by a single operation a plurality of different oils to parts requiring different lubricants; as for instance common lubricating oil adapted for external lubrication including the bearings of machinery, and for internal lubrication fine lubricating oil adapted to be carried by the steam, air or other motive fluid into the motive cylinders and chests for lubricating the pistons and valves therein.

Another object of the invention is to provide a lubricator of this character which may be easily reversed and operated by power to take in or distribute lubricants.

Another object of the invention is to secure steady pressure of the oil feeds.

The accompanying drawing represents a side elevation partly in section of a duplex lubricator embodying one form of this invention.

This lubricator comprises when constructed in the form shown in the figure a motor cylinder 10, an oil cylinder 20 of smaller diameter than the cylinder 10 and disposed in alinement with and opening into said cylinder 10 and an oil cylinder 30 also of smaller diameter than the cylinder 10 and disposed in alinement with the cylinders 10 and 20. The motor cylinder 10 and the cylinder 20 are preferably united in the same structure. The outer end of the cylinder 10 is closed by a head 11 having a stuffing box 12 and the outer end of the cylinder 20 is closed by a head 21 having a stuffing box 22.

The oil cylinder 30 is preferably disposed some distance from the outer end of the oil cylinder 20 and is connected therewith by flanged plates 23 and 24. This cylinder 30 is closed at its inner end by a plate 31 having a stuffing box 32 and at its outer end by a head 33, preferably provided with a recess 34 on its inner face.

An elongated piston rod 40 extends through the cylinder 10, through the cylinder 20, through the space between the oil cylinders 20 and 30 and through the stuffing box 32 into the oil cylinder 30. This piston rod has a stop collar 41 at its outer end within the cylinder 10. A rod 42 connected at its inner end to the outer end of said piston rod extends through the stuffing box 12 and serves as a guide for and extension of said piston rod. This rod 42 is provided at its outer end with a loop or handle 43 and with a lateral finger 44. A piston 45 corresponding to the diameter of the cylinder 10 and provided with any suitable packing $f$ is secured to the piston rod 40 within said cylinder and smaller pistons 46 and 47 are secured to said rod 40 within the oil cylinders 20 and 30 respectively. A graduated scale rod 50 is fixed to the head of the cylinder 10 and extends outward therefrom parallel with the guide rod 42. The finger 44 of the said guide rod 42 travels over this scale rod and indicates the quantity of oil drawn into the oil cylinders.

An oil supply pipe 25 provided with a valve 110 connects the oil cylinder 20 with the lower compartment 61 of a reservoir 60 or other source of supply and an oil supply pipe 35 provided with a valve 109 connects the oil cylinder 30 with the upper compartment 62 of the reservoir 60 or other source of supply. The compartments 61 and 62 are designed to contain different kinds or grades of lubricating oils.

An oil feed pipe 26 provided with a check valve 101 and a stop cock 106 leads out from the head 21 of the oil cylinder 20 to any number of bearings or machines to be lubricated and through its connection 90 through the motive fluid to the cylinders of any number of engines to be lubricated. An oil feed pipe 36 provided with a check valve 102 and a stop cock 105 leads out from the outer head of the oil cylinder 30 to any number of machines, the bearings of which require an oil of a different grade or character from that supplied by the cylinder 20.

A motive fluid pipe 70 connects the head 11 of the cylinder 10 with a motive fluid supply pipe 80 which is connected with the source of the motive fluid of the plant— whether steam, water, air or gas. The pipe 70 is provided with a stop cock 71, with a check valve 72 for reducing the pressure when necessary, and with a pet cock 108. A pipe 75 provided with a stop cock 76 and a pet cock 100 connects the opposite end of the motive cylinder 10 with the motive fluid pipe 80. A pipe 90 provided with a cock 91 connects the oil delivery pipe 26 with the motive fluid pipe 70. This pipe 90 is provided with a glass sight tube 92 adjacent to the cylinder 10 to indicate what quantity of oil is being fed by gravity into the engine cylinder through its supply pipe 70.

In use this lubricator is installed in the engine room of the plant or factory where it is under the eye of the engineer. The reservoir 61 is filled with cylinder oil and the reservoir 62 with common lubricating oil. To charge the oil cylinders 20 and 30 the cocks 109 and 110 in the oil supply pipes 25 and 35 are opened; the rod 42 is drawn out or pushed out as in the figure by fluid pressure admitted through cock 76 of pipe 75 into the cylinder 10 behind the plunger 45 and the plungers 46 and 47 are thus moved toward the front ends of their cylinders as shown in the figure and oil will enter said cylinders in quantities indicated by the finger 44 on the scale 50. Then cocks 109, 110 and 76 are closed and cocks 71, 91, 106 and 105 are opened and fluid pressure is admitted from the motive fluid pipe 80 through the pipe 70 into the actuating cylinder 10 in front of the plunger 45. The oils in the oil cylinders 20 and 30 are thereby subjected to pressure by the plungers therein and forced out through the feed pipes 26, 36 and 90 for any required distance to the bearings to be oiled. The oil supplied through cylinder 20, which is fed through the pipes 26 and 90, is what is known as cylinder oil of a grade adapted to be carried by the steam or other motive fluid for the lubrication of pistons within their cylinders, and the oil supplied through cylinder 30 and the pipe 36 is common lubricating oil for lubricating the bearings of machines. The drip cock 100 in pipe 75 operates when open to release any pressure that may exist in cylinder 10 above the plunger 45. The check valve 101 in the pipe 26 and the check valve 102 in the pipe 36 operate to release any excess of pressure in cylinders 20 and 30 respectively. Any surplus oil that may flow through these check valves may be caught in cups and reconducted to the supply tank 60. When the piston 45 has completed its upward stroke the pistons 46 and 47 have forced out the oils from cylinders 20 and 30 and the apparatus is then reversed for refilling said oil cylinders. To effect the reversal of the lubricator and refilling thereof, the valves 71, 91, 100, 105 and 106 are closed and petcocks 107 and 108 and valves 109 and 110 are opened. Then valve 76 is opened and steam is admitted to the cylinder 10 in front of the plunger 45 and the latter is thereby reversed or moved in a downward or opposite direction to that before described. The pistons 46 and 47 of the oil cylinders are thereby moved in downward or reversed direction and oils from the tanks 61 and 62 are sucked into said oil cylinders. When the oil cylinders are thus recharged the valves and pet cocks are reset.

This apparatus will maintain a steady pressure plural feed to the parts to be lubricated according to their requirements.

I claim as my invention:—

A force feed lubricator comprising a motor cylinder, a plurality of oil cylinders of smaller diameters than said motor cylinder, means for supplying different lubricants to said oil cylinders pistons in all said cylinders, a piston rod connecting all said pistons and operative to simultaneously distribute a plurality of different lubricating oils to various points for lubrication, oil feed pipes leading out of said cylinders, a motive fluid pipe, a pipe connecting said motive fluid pipe with said motor cylinder and a pipe connecting pipe last mentioned with one of said feed pipes.

ALBERT E. SCHAD.

Witnesses:
   J. THOMAS MITCHELL,
   PEARL ROYER.

---

Copies of this patent may be obtained for five cents each, by addressing the "Commissioner of Patents, Washington, D. C."